(12) United States Patent
Shiotani (10) Patent No.: US 11,818,775 B2
(45) Date of Patent: Nov. 14, 2023

(54) COMMUNICATION SYSTEM, ELECTRONIC DEVICES AND NON-TRANSITORY COMPUTER-READABLE RECORDING MEDIUM THEREFOR

(71) Applicant: BROTHER KOGYO KABUSHIKI KAISHA, Nagoya (JP)

(72) Inventor: Takeshi Shiotani, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 199 days.

(21) Appl. No.: 17/207,863

(22) Filed: Mar. 22, 2021

(65) Prior Publication Data

US 2021/0307086 A1 Sep. 30, 2021

(30) Foreign Application Priority Data

Mar. 26, 2020 (JP) .................... 2020-056104

(51) Int. Cl.
*H04W 76/10* (2018.01)
*H04W 88/06* (2009.01)
*H04W 48/16* (2009.01)
*H04W 88/08* (2009.01)
*G06F 3/12* (2006.01)

(52) U.S. Cl.
CPC .......... *H04W 76/10* (2018.02); *G06F 3/1203* (2013.01); *G06F 3/1236* (2013.01); *G06F 3/1292* (2013.01); *H04W 48/16* (2013.01); *H04W 88/08* (2013.01)

(58) Field of Classification Search
None
See application file for complete search history.

(56) References Cited

U.S. PATENT DOCUMENTS

2014/0068719 A1* 3/2014 Kiukkonen ........... H04W 12/50 726/4
2014/0289824 A1* 9/2014 Chan ........................ G06F 8/44 726/5

(Continued)

FOREIGN PATENT DOCUMENTS

JP 2016-178412 A 10/2016
JP 2017-112432 A 6/2017

*Primary Examiner* — Duc T Duong
(74) *Attorney, Agent, or Firm* — Scully, Scott, Murphy & Presser, P.C.

(57) ABSTRACT

A communication system includes an information processing terminal, a first electronic device of which setup to connect to an access point of a wireless network, and a second electronic device. The information processing terminal transmit a transmission request of connection information to the first electronic device, and the first electronic device obtains authentication information based on the transmission request and determine whether to permit transmission of the connection information. The first electronic device transmit the connection information to the information processing terminal when determining to permit the transmission, but not transmit the connection information when determining not to permit the transmission. When receiving the connection information, the information processing terminal transmit the connection information to the second electronic device, and the second electronic device completes the setup using the received connection information.

10 Claims, 6 Drawing Sheets

(56) References Cited

U.S. PATENT DOCUMENTS

| | | | |
|---|---|---|---|
| 2014/0351444 A1* | 11/2014 | Qi | H04L 67/1068 |
| | | | 709/227 |
| 2014/0373123 A1* | 12/2014 | Kang | H04W 4/80 |
| | | | 715/736 |
| 2017/0127276 A1* | 5/2017 | Koo | H04L 63/0807 |
| 2018/0152840 A1* | 5/2018 | Nagasaki | H04W 48/18 |
| 2018/0159855 A1* | 6/2018 | Ha | G06F 21/35 |
| 2018/0295662 A1* | 10/2018 | Kang | H04W 76/15 |
| 2019/0373469 A1* | 12/2019 | Bradley | H04W 12/069 |
| 2020/0154276 A1* | 5/2020 | Minakawa | H04W 12/0431 |
| 2020/0196366 A1* | 6/2020 | Ahn | H04W 48/16 |
| 2020/0296793 A1* | 9/2020 | Cheong | H04W 88/06 |
| 2020/0329017 A1* | 10/2020 | Kim | A61B 5/002 |
| 2022/0046414 A1* | 2/2022 | Minakawa | H04W 12/03 |
| 2022/0201775 A1* | 6/2022 | Lee | H04W 76/14 |
| 2022/0287110 A1* | 9/2022 | Kwon | G10L 15/26 |

* cited by examiner

COMMUNICATION SYSTEM, ELECTRONIC DEVICES AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2020-056104 filed on Mar. 26, 2020. The entire subject matter of the application is incorporated herein by reference.

BACKGROUND

Technical Field

The present disclosures relate to a communication system, electronic devices, and a non-transitory computer-readable recording medium storing programs for connecting to a wireless network.

In recent years, there has been known a communication system in which a plurality of electronic devices is connected to a wireless network via an access point. In order to connect a plurality of electronic devices to the wireless network, each electronic device needs to be set up to connect to the access point of the wireless network using connection information. Conventionally, there has been known a configuration in which a mobile device obtains the connection information set in a first device by an NFC communication, the mobile device sends the connection information to a second device by the NFC communication, and the second device completes the setup using the received connection information.

SUMMARY

By allowing an information processing terminal such as the mobile device to obtain connection information from the first electronic device and pass the connection information to the second electronic device, a user's work for the setup of the second electronic device becomes easier. However, if the connection information used for the setup is unnecessarily passed, the security of the device may be compromised. The second electronic device could easily be connected to a low-security wireless network as well. Therefore, the security of the electronic device becomes an issue, such as the unauthorized use of the electronic device.

According to aspects of the present disclosure, there is provided a communication system including a first electronic device, a second electronic device and an information processing terminal, and is configured to perform wireless communication using a wireless network, a connection setup of the first electronic device to an access point of the wireless network using connection information being completed. The information processing terminal is configured to transmit a transmission request to the first electronic device, the transmission request requesting the first electronic device to transmit the connection information the first electronic device possesses. The first electronic device is configured to perform obtaining authentication information in response to receipt of the transmission request determining whether to permit transmission of the connection information based on the authentication information as obtained, and when it is determined, in the determining, to permit transmission of the connection information, transmitting the connection information the first electronic device possesses to the information processing terminal, and when it is determined, in the determining, not to permit transmission of the connection information, not transmitting the connection information to the information processing terminal. When receiving the connection information from the first electronic device in response to the transmission request, the information processing terminal transmits the received connection information to the second electronic device. When receiving the connection information from the information processing terminal, the second electronic device completes the connection setup using the connection information received from the information processing terminal.

According to aspects of the present disclosure, there is provided an electronic device, comprising a communication interface, and a computer. When the computer is in a state where a setup to connect to an access point of a wireless network using connection information has been completed and receives, from an information processing terminal, a transmission request requesting to transmit the connection information via the communication interface, the computer is configured to perform an obtaining process of obtaining authentication information in response to receipt of the transmission request, a transmission determining process of determining whether to permit transmission of the connection information based on the authentication information obtained in the obtaining process, and a transmission process of transmitting the connection information the electronic device possesses to the information processing terminal via the communication interface when it is determined in the transmission determining process to permit transmission of the connection information, the connection information being not transmitted to the information processing terminal when it is determined in the transmission determining process to not permit transmission of the connection information. When the information processing terminal receives the connection information from the electronic device based on the transmission request, the information processing terminal transmits the received connection information to an other electronic device, when receiving the connection information the other electronic device possesses from the information processing terminal via the communication interface, the computer is further configured to perform a setup process of completing the setup using the connection information, and a setup result transmitting process of transmitting a result of the setup in the setup process to the information processing terminal via the communication interface.

According to aspects of the present disclosure, there is provided a non-transitory computer-readable recording medium for an information processing terminal having a computer, the non-transitory recording medium containing computer-executable instructions realizing a program, the instructions cause, when executed by the computer, the computer to perform a first transmission process of transmitting a transmission request to a first electronic device, of which setup to connect to an access point of a wireless network using connection information has been completed, the transmitting request requesting transmission of the connection information the first electronic device possesses, the first electronic device receiving the transmission request obtaining authentication information in response to receipt of the transmission request, determining whether to permit transmission of the connection information based on the obtained authentication information, when determining to permit the transmission of the connection information, transmitting the connection information the first electronic device possesses to the information processing terminal, when determining to inhibit the transmission of the connection information, not transmitting the connection information to the information processing terminal, and when receiving the connection information from the first electronic device based on the transmission request, a second transmission process of transmitting the received connection information to a second electronic device, the second electronic device received the connection information completing the setup using the received connection information.

DETAILED DESCRIPTION OF THE EMBODIMENTS

Initially, a first embodiment embodying a communication system according to aspects of the present disclosures will be described in detail below, with reference to the accompanying drawings. This embodiment discloses a communication system including an information processing terminal and electronic devices, which communicate wirelessly via a wireless network.

Figure 1:
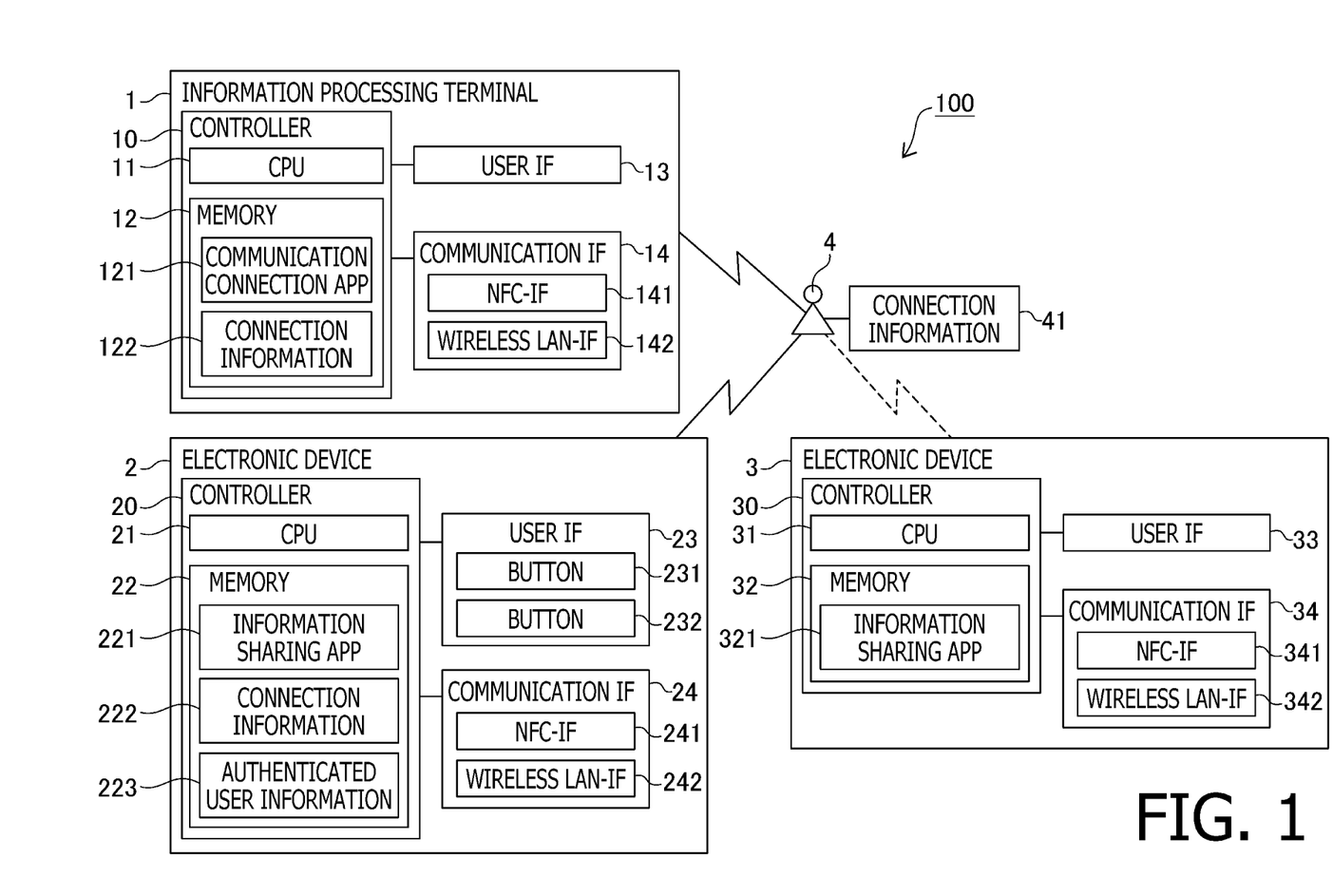
FIG. 1 is a schematic block diagram of a communication system according to a first embodiment.

As shown in FIG. 1, a communication system 100 in this embodiment includes an information processing terminal 1, a plurality of electronic devices including an electronic device 2 and an electronic device 3, and an access point 4 of a wireless network. The information processing terminal 1 is a portable device, e.g., a smartphone or a tablet computer.

The access point 4 is a communication device for connecting various devices to a wireless network, such as the Internet or a LAN, by means of Wi-Fi (registered trademark) wireless communication, based on the IEEE 802.11 standard and its equivalent standards. Each access point has its own unique connection information set. A device using the access point 4 must complete a setup, which is a procedure for connecting the device to the access point 4, using the connection information 41 of the access point 4.

The connection information 41 is, for example, a pair of identifier of the access point 4 (hereinafter, referred to as "SSID") and a password corresponding to the SSID. The device performing the setup sends the correspondingly set password to the access point 4 specified by the SSID and completes the setup by obtaining the IP address issued by the access point 4. The connection information 41 may be one piece of authentication information (Wi-Fi Easy Connect connection information) which is a combination of the SSID and the password.

As shown in FIG. 1, the information processing terminal 1 in this embodiment is equipped with a controller 10 including a CPU 11 and a memory 12. The information processing terminal 1 is also provided with a user interface (hereinafter, referred to as "user IF") 13 and a communication interface (hereinafter referred to as "communication IF") 14, which are electrically connected to the controller 10. The controller 10 in FIG. 1 is a generic term that summarizes hardware and software used to control the information processing terminal 1 and does not necessarily represent a single piece of hardware that actually exists in the information processing terminal 1.

The CPU 11 executes various processes in accordance with programs read from the memory 12 and based on user operations. The CPU 11 is an example of a computer. The memory 12 is a storage area in which various programs, such as a startup program for starting the information processing terminal 1, various application programs (hereinafter, referred to as "applications") and the like, various pieces of data such as image data and document data, and various setting information are stored. The memory 12 is also used as a work area in which various processes are performed.

The user IF 13 includes hardware that displays a screen for informing the user of information, and hardware that receives operations by the user. An example of the user IF 13 is a touch panel. The user IF 13 may be a combination of a display and a keyboard, a mouse, a trackball, and the like.

The communication IF 14 includes various hardware for communicating with an external device. The communication IF 14 includes, for example, an NFC interface (hereinafter, referred to as "NFC-IF") 141, a wireless LAN interface (hereinafter, referred to as "wireless LAN-IF") 142n The NFC-IF 141 is an interface that enables wireless communication in accordance with the NEC method based on the international standards of ISO/IEC 21481 or ISO/IEC 18092. The wireless LAN-IF 142 is an interface that enables wireless communication in accordance with the Wi-Fi method. The communication IF 14 may further include configurations for other communication standards, e.g., Bluetooth (registered trademark) or hardware for wired communication.

The memory 12 of the information processing terminal 1 in this embodiment stores a communication connection app 121 and connection information 122, as shown in FIG. 1. The communication connection app 121 is a program configured to cause a device that has not yet been set up to connect to the access point 4 to complete the setup. The connection information 122 includes connection information 41 of the access point 4. The connection information 122 may also include connection information of an access point other than the access point 4. The information processing terminal 1 has already obtained the connection information 41 of the access point 4, and the setup to connect to the access point 4 is complete.

Each of the electronic device 2 and the electronic device 3 of this embodiment is a device having at least a wireless communication function, e.g., an MFP, a printer, a scanner, a facsimile device, a sewing machine, a camera and the like. The electronic device 2 and the electronic device 3 may be the same kind of device or a different kind of device. The electronic device 2 and the electronic device 3 may be the same type of device and may be the same model or different models.

The electronic device 2 has a controller 20 including a CPU 21, a memory 22, as shown in FIG. 1. The electronic device 2 also has a user IF 23 and a communication IF 24, which are electrically connected to the controller 20. The user IF 23 includes, for example, a touch screen, and hardware that displays a screen for informing the user of information, and hardware that receives operations by the user. The communication IF 24 includes at least an NFC-IF 241 and a wireless LAN-IF 242, and may also include a configuration corresponding to other communication standards, e.g., hardware for wired communication.

Further, the user IF 23 of the electronic device 2 includes at least a button 231 and a button 232. Both the button 231 and the button 232 may be hardware buttons specific to the device, both may be software buttons displayed on the touch screen from when necessary, or both may be a combination of hardware and software buttons.

The electronic device 3 has a controller 30 including a CPU 31, a memory 32, as shown in FIG. 1. The electronic device 3 also has a user IF 33 and a communication IF 34, which are electrically connected to the controller 30. The user IF 33 includes, for example, a touch panel and hardware for displaying a screen for informing the user of information, and hardware for receiving operations by the user. The communication IF 34 includes at least an NFC-IF 341 and a wireless LAN-IF 342, and may also include a configuration corresponding to other communication standards, e.g., hardware for wired communication. The CPU 21 of electronic device 2 and the CPU 31 of electronic device 3 are examples of a computer.

The electronic device 2 and the electronic device 3 have configurations for realizing functions of the respective devices in addition to the configurations shown in the drawings. For example, when the electronic device is a printer, it has a configuration for printing, and if the electronic device is a scanner, it has a configuration for scanning an image.

Both the electronic device 2 and the electronic device 3 are in a state of detecting an information processing terminal capable of performing the NFC wireless communication in response to a signal periodically output from the NFC-IF 241 or the NFC-IF 341 while the power is on. For example, when the information processing terminal 1 with the NFC function enabled comes within a particular distance of the NFC-IF 241 or NFC-IF 341, the electronic device 2 or the electronic device 3 detects that the information processing terminal 1 has approached, and the wireless communication between the terminal 1 and the electronic device 2 or electronic device 3 is automatically enabled using the NFC method. It is noted that the information processing terminal 1 is a portable device, and the user can easily bring the NFC-IF 141 of the information processing terminal 1 into proximity with the NFC-IF 241 of electronic device 2 or the NFC-IF 341 of electronic device 3.

Each of the electronic device 2 and the electronic device 3 is further equipped with a wireless LAN access point function and is capable of supporting a Wi-Fi direct (hereinafter, referred to as "WFD") type wireless communication. In other words, the electronic device 2 and the electronic device 3 each store connection information according to the WED method and have a function to construct a network with the client device as a group owner device that manages the network. The WED system is different from the NFC system in that the WFD system has a wider communication range and a higher communication speed than the NFC system.

Concretely, each of the electronic device 2 and the electronic device 3, for example, transmits the WFD connection information of its own device in the NFC format when the wireless communication in the NFC format becomes possible. When the information processing terminal 1 receives the WFD connection information according to the NFC method, the information processing terminal 1 transmits the received WFD connection information via the wireless LAN-IF 142 to enable WFD communications with the electronic device 2 or the electronic device 3 as a client device.

The memory 22 of the electronic device 2 stores an information sharing application 221, connection information 222, and authenticated user information 223. The information sharing application 221 is a program for sharing connection information of the access point with other electronic devices in cooperation with the communication connection app 121 of the information processing terminal 1. When the electronic device 2 has completed the setup of the electronic device 2 itself connecting to the access point and has stored the connection information of the access point, the electronic device 2 passes the connection information to the other electronic devices by executing the information sharing app 221. If the electronic device 2 receives the connection information of the access point from the other electronic device by executing the information sharing app 221, the electronic device 2 uses the received connection information to set up the electronic device 2 itself.

The connection information 222 of the electronic device 2 includes connection information 41 of the access point 4. The electronic device 2 has already obtained the connection information 41 of the access point 4, and the setup to connect to the access point 4 is complete. The electronic device 2 is a device capable of performing the wireless communication with the information processing terminal 1 via the access point 4. The electronic device 2 is an example of the first electronic device.

The authenticated user information 223 of the electronic device 2 is information indicating a user who is authorized to perform a process for sharing connection information. The authenticated user information 223 is, for example, administrator information indicating a user having an administrator attribute of the communication system 100, and usage information indicating an availability of sharing the connection information of the wireless network for each user. In addition to the availability of sharing the connection information, the usage information may also include information on the availability of each function of the electronic device 2, such as printing and scanning, for each user.

The electronic device 3, on the other hand, is a device that does not have the connection information 41 of the access point 4 and is not yet set up. The memory 32 of the electronic device 3 stores at least an information sharing app 321. The information sharing app 321 is a program with the same functionality as the information sharing app 221 of electronic device 2. The electronic device 3 is an example of a second electronic device.

Hereinafter, with reference to a sequence diagram of FIG. 2, a procedure of the information sharing process for completing the setup at the electronic device 3 in the communication system 100 according to the present embodiment will be described. The information sharing process in the present embodiment is performed, for example, to ensure that the connection information 222 possessed by the connected electronic device 2 is passed to the electronic device 3 when a new electronic device 3 is to be added to the wireless network using the access point 4.

The information sharing process is started by the CPU 11 of the information processing terminal 1 in response to the communication connection app 121 being started in the information processing terminal 1. In FIG. 2, the processing of the information processing terminal 1 is executed by the CPU 11, the processing of the electronic device 2 is executed by the CPU 21, and the processing of the electronic device 3 is executed by the CPU 31.

At the start of this information sharing process, the information processing terminal 1 and the electronic device 2 are in a state of being able to communicate with each other. For example, the communication connection app 121 stores information of an electronic device equipped with the information sharing application and information of an access point to which the electronic device is already set up in relation to each other. The user selects the electronic device 2, which is an electronic device stored in the communication connection app 121 in association with the access point 4, which is the access point to which the user wishes to connect the electronic device 3, and connects information processing terminal 1 and the electronic device 2.

A communication method between the information processing terminal 1 and the electronic device 2 may be a Wi-Fi method through the access point 4 or the like, wireless communication according to other methods, or wired communication. Alternatively, if the information processing terminal 1 and the electronic device 2 are not in a state of being able to communicate with each other at the start of the information sharing process, the information processing terminal 1 displays a message on the user IF 13 prompting the user to connect to the electronic device 2. For example, if the information processing terminal 1 is held over the NFC-IF 241 of the electronic device 2 by the user, the information processing terminal 1 becomes communicable with the electronic device 2 in accordance with the WFD method.

In the information sharing process, the information processing terminal 1 transmits, to the electronic device 2, an instruction to start the information sharing, i.e., to launch the information sharing app 221 (S101). The electronic device 2 launches the information sharing app 221 following the instructions (S102) and transmits information about the completion of the launch to the information processing terminal 1 (S103). The electronic device 2 becomes able to receive a request from the information processing terminal 1 by launching the information sharing application 221.

The user holds the information processing terminal 1 over the electronic device 3 (S104). This brings the NFC-IF 141 of the information processing terminal 1 and the NFC-IF 341 of the electronic device 3 into close proximity, so that the information processing terminal 1 and the electronic device 3 becomes in a state of communicating with each other using the NFC method. Further, the electronic device 3 transmits the connection information of the WFD method the electronic device possesses (S105), and the information processing terminal 1 transmits the received connection information, so that the information processing terminal 1 and the electronic device 3 become in a state of being connected in accordance with the WFD method (S106).

Then, the information processing terminal 1 launches the information sharing application 321 at the electronic device 3 as was done in S101 to S103. Concretely, the information processing terminal 1 transmits an instruction, to the electronic device 3 connected to the WFD system, to launch the information sharing application 321 (S107). The electronic device 3 launches the information sharing application 321 (S10S) and transmits information indicating the completion of the launch to the information processing terminal 1 (S109).

The connection between the electronic device 3 and the information processing terminal 1 in accordance with the WFD method may be done before the information sharing process is started. Alternatively, if another NFC-IF is proximate to the NFC-IF 341 when the setup is not completed, the electronic device 3 may send the connection information of the WFD method if the communication connection app 121 is running on the device.

In response to receipt of an execution instruction by the user (S110), the information processing terminal 1 sends a transmission request, to the electronic device 2, requesting transmission of the connection information 222 (S111). S111 is an example of a first transmission process. When the electronic device 2 receives the transmission request from the information processing terminal 1, the electronic device 2 obtains the authentication information corresponding to the transmission request (S112) and executes authentication, based on the obtained authentication information, to determine whether or not to send the connection information 222 (S113). S112 is an example of an obtaining process, and S113 is an example of a transmission determining process.

Concretely, the information processing terminal 1 transmits user information indicating the user operating the information processing terminal 1 in conjunction with the transmission request in S111. For example, the information processing terminal 1 receives and stores the user information in advance via the communication connection app 121, and sends the stored user information in S111. Alternatively, the information processing terminal 1 may send the identification information of the information processing terminal 1 itself.

The electronic device 2 receives the user information sent in conjunction with the transmission request in S112 and obtains the received user information as the authentication information. Further, in S113, the electronic device 2 determines, based on the authenticated user information 223 stored in the memory 22, whether the obtained user information is information indicating a user to be authenticated or not.

When the obtained user information is, for example, information indicating a user included in the administrator information, the electronic device 2 determines the user is a user to be authenticated. When the user has an administrator attribute, it is likely that the user is requesting a connection to an appropriate wireless network, and therefore the electronic device 2 allows the connection information 222 to be sent. On the other hand, when the user does not have the administrator attribute, it is more likely that the user is requesting a connection to an inappropriate wireless network, and therefore the electronic device 2 does not allow the connection information 222 to be sent, thereby increasing the security of the wireless network.

Alternatively, when the usage information indicating the availability of sharing of the connection information of the wireless network is stored in association with the obtained user information, the electronic device 2 determines that the user is a user to be authenticated. When the usage information indicating the unavailability of sharing of the connection information is stored, the electronic device 2 determines that the user is not a user to be authenticated. In this way, the availability of usage of the transmission function of the connection information can be determined for each user. Since a user who is not authorized to use the transmission function of the connection information cannot pass the connection information 222, the security of the wireless network can be enhanced.

Still alternatively, when the usage information indicating the availability of each function of the electronic device 2, such as printing and scanning, is stored in association with the obtained user information, the electronic device 2 determines the user as a user to be authenticated. When the usage information indicating the unavailability of the electronic device 2 is stored, the electronic device 2 determines the user as a user not to be authenticated. In this way, the security of the wireless network can be enhanced since a user who is not authorized to use the functions of the electronic device 2 cannot pass the connection information 222.

When the electronic device 2 determines that the user is to be authenticated, i.e., the authentication is successful ([SUCCESS] in FIG. 2), the electronic device 2 encrypts the connection information 222 stored in the memory 22 using a particular method (S120). The electronic device 2 encrypts at least the password of the access point 4 among items contained in the connection information 222, and generates the encrypted information including a set of the SSID of the access point 4 and the encrypted password. The electronic device 2 then transmits the generated encrypted information to the information processing terminal 1 (S121). It is noted that S121 is an example of the transmission process.

The information processing terminal 1 transmits the received encrypted information to the electronic device 3 as it is (S122). It is noted that S122 is an example of the second transmission process. When sending the encrypted information, the information processing terminal 1 may also send information instructing decryption and setup for connecting the access point 4.

The electronic device 3 decrypts the encrypted information received from the information processing terminal 1 (S123). The electronic device 2 and the electronic device 3 have an encryption function and a decryption function using a common method. By receiving the encrypted information wherein the connection information 222 is encrypted using a particular method, the electronic device 3 can confirm that the received information is not information generated at the information processing terminal 1, but is information transmitted from the electronic device 2, i.e., the connection information 222 to be set up. The information processing terminal 1 does not need to have a decryption function because the received information can be transferred as is. By making it impossible for the information processing terminal 1 to decrypt the information, the security of the connection information 222 is ensured.

Further, the electronic device 3 uses the decrypted information to send a password to the access point 4 indicated by the connection information 222 to perform the setup (S124). It is noted that S124 is an example of a setup process.

When receiving the password and the received password matches the password which is set to the access point 4 itself, the access point 4 sets up the address information, such as the IP address, for the device that sent the password as a connection target. The electronic device 3 receives the address information from the access point 4 (S125), which completes the setup.

The electronic device 3 transmits the address information received from the access point 4 to the information processing terminal 1 as information indicating a result of the setup (S126). The address information is, for example, an IP address assigned by the access point 4 to the electronic device 3. It is noted that S126 is an example of a setup result transmission process. The information processing terminal 1 can determine that the setup by the electronic device 3 is complete by receiving the address information.

On the other hand, when the electronic device 2 determines that the authentication has failed ([FAILURE] in FIG. 3), the electronic device 2 sends failure information, which is information indicating the failure of the authentication, to the information processing terminal 1 (S128). When receiving the failure information, the information processing terminal 1 informs the user IF 13 of the message indicating that the authentication has failed (S129).

The information processing terminal 1 disconnects the communication with the electronic device 3 according to the WFD method after receiving the address information from the electronic device 3 in S126 or after reporting the failure of the authentication in S129 (S130). Further, the information processing terminal 1 instructs the electronic device 2 to terminate the information sharing app 221 (S131) and terminates the communication connection app 121 of the information processing terminal 1 itself (S132). The electronic device 3 also terminates the information sharing app 321 after the communication according to the WFD method is disconnected in S130. When the electronic device 3 completes the setup and disconnects the communication according to the WFD method, the electronic device 3 may start the wireless communication according to the Wi-Fi method via the access point 4. The information processing terminal 1 may start the wireless communication with the electronic device 3 according to the Wi-Fi method via the access point 4 using the address information received from the electronic device 3.

The electronic device 2 may terminate the information sharing app 221 after sending the encrypted information in S121 or the failure information in S128, in which case the information processing terminal 1 does not need to make the instructions of S131. Further, the information processing terminal 1 may share information with other electronic devices using the currently-running communication connection app 121. In such a case, the information processing terminal 1 may ask the user whether to terminate the communication connection app 121 or select another electronic device.

The access point 4, for which the electronic device 2 is already set up, is a highly secure access point, and the electronic device 2 has secure connection information 222. On the other hand, the information processing terminal 1 may store the connection information for multiple access points, and the reliability of the user using the information processing terminal 1 is unknown. Since it is not desirable for the electronic device 3 to be connected unnecessarily to an access point other than the access point 4, in this embodiment, the connection information 122 possessed by the information processing terminal 1 is not passed to the electronic device 3, and the connection information 222 possessed by the electronic device 2 is passed to the electronic device 3. This ensures that the electronic device 3 is connected to a secure wireless network via the access point 4.

Next, another example of the authentication method will be described. The authentication method in the electronic device 2, i.e., the procedure performed in S112 and S113 in the sequence diagram of FIG. 2, is not limited to the method based on the user information sent in conjunction with the transmission request described above.

For example, the electronic device 2 may be configured to receive input of the authentication information through the user IF 23. In that case, the information processing terminal 1 does not need to send the user information in conjunction with the transmission request. Alternatively, the electronic device 2 may be configured to receive the input of the authentication information through the user IF 23 when the user information is not received with the transmission request. When the authentication information is received with the transmission request, the received authentication information is used, while when the authentication information is not received, the electronic device 2 asks the user to enter the authentication information, thereby reducing the time and effort for the user to enter the authentication information on the electronic device 2.

The authentication information received through the user IF 23 is, for example, the user information. Concretely, the electronic device 2 accepts a user's login and obtains the user information based on the accepted login information. The electronic device 2 executes authentication based on the user information accepted by the electronic device 2 itself, in the same manner as described above referring to S113. The user's login method includes, for example, holding a user authentication card over the NFC-IF 241, and accepting the user information such as a user name and password entered through the user IF 23. Alternatively, when the electronic device 2 is a device having a barcode reading function or a scanning function, the user may make the device to read a particular code or mark using such a function.

The authentication information received through the user IF 23 may be operation information indicating that a particular operation has been received. The electronic device 2 may, for example, wait until the particular operation is received through the user IF 23 when the user information is not received in conjunction with the transmission request.

Figure 3:
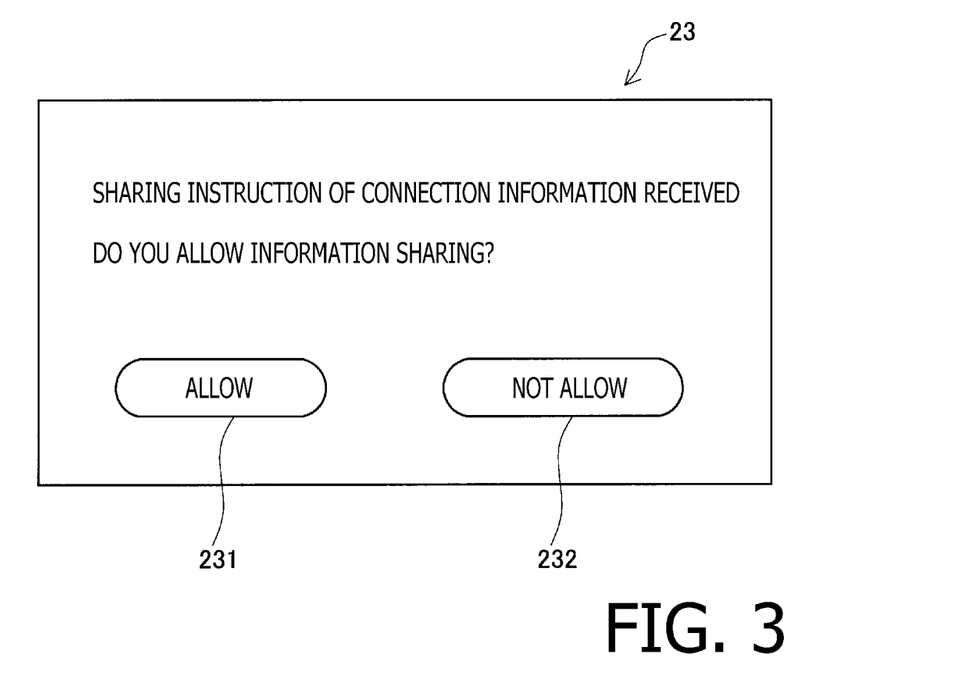
FIG. 3 shows an example of a screen for receiving authentication information.

If the user IF 23 of the electronic device 2 is a touch panel, the electronic device 2 displays on the user IF 23, for example, as shown in FIG. 3, the button 231 to accept instructions to allow information sharing and the button 232 to accept instructions not to allow information sharing, and receives the user's operation of the button 231 or the button 232. When an operation of the button 231 is received, the electronic device 2 determines that the authentication is successful, while when an operation of the button 232 is received, the electronic device 2 determines that the authentication is unsuccessful. In this case, the button 231 is an example of a first button and the button 232 is an example of a second button. When the user IF 23 of the electronic device 2 is not the touch panel, the electronic device 2 may display a message indicating, for example, that an instruction to allow or not allow information sharing should be entered by particular buttons, and an operation to each button is received.

Since the electronic device 2 is reliable, the user who can perform operations on the electronic device 2 through the user IF 23 can be presumed to be reliable. It is possible to avoid unnecessary sharing of the connection information by asking the user whether the sharing of the connection information is acceptable, and receiving the user's operation. It is noted that information indicating whether information sharing is acceptable through the user IF 23 of the electronic device 2 may be displayed on the user IF 13 of the information processing terminal 1.

As described in detail above, according to the communication system 100 of the present embodiment, the electronic device 2 obtains the authentication information and performs the authentication determination when passing the connection information 222 of the access point 4 possessed by the electronic device 2 itself to the electronic device 3 via the information processing terminal 1. The electronic device 2 passes the connection information 222 when the authentication is successful, and the electronic device 3 completes the setup using the passed connection information 222, thus reducing the work of the user. On the other hand, the electronic device 2 does not pass the connection information 222 when the authentication fails, which avoids the electronic device 3 from being connected to the wireless network unnecessarily, thus reducing the security of the communication system 100.

Next, a second embodiment of the communication system will be described in detail with reference to the accompanying drawings. This embodiment discloses a communication system 200 further including a server that can be connected to the communication system described in the first embodiment. The information sharing process of this embodiment differs from the first embodiment in the method of obtaining the authentication information and the method of authentication thereof. The configurations and procedures common to the first embodiment are assigned with the same reference numbers/symbols and the description thereof will be omitted.

Figure 4:
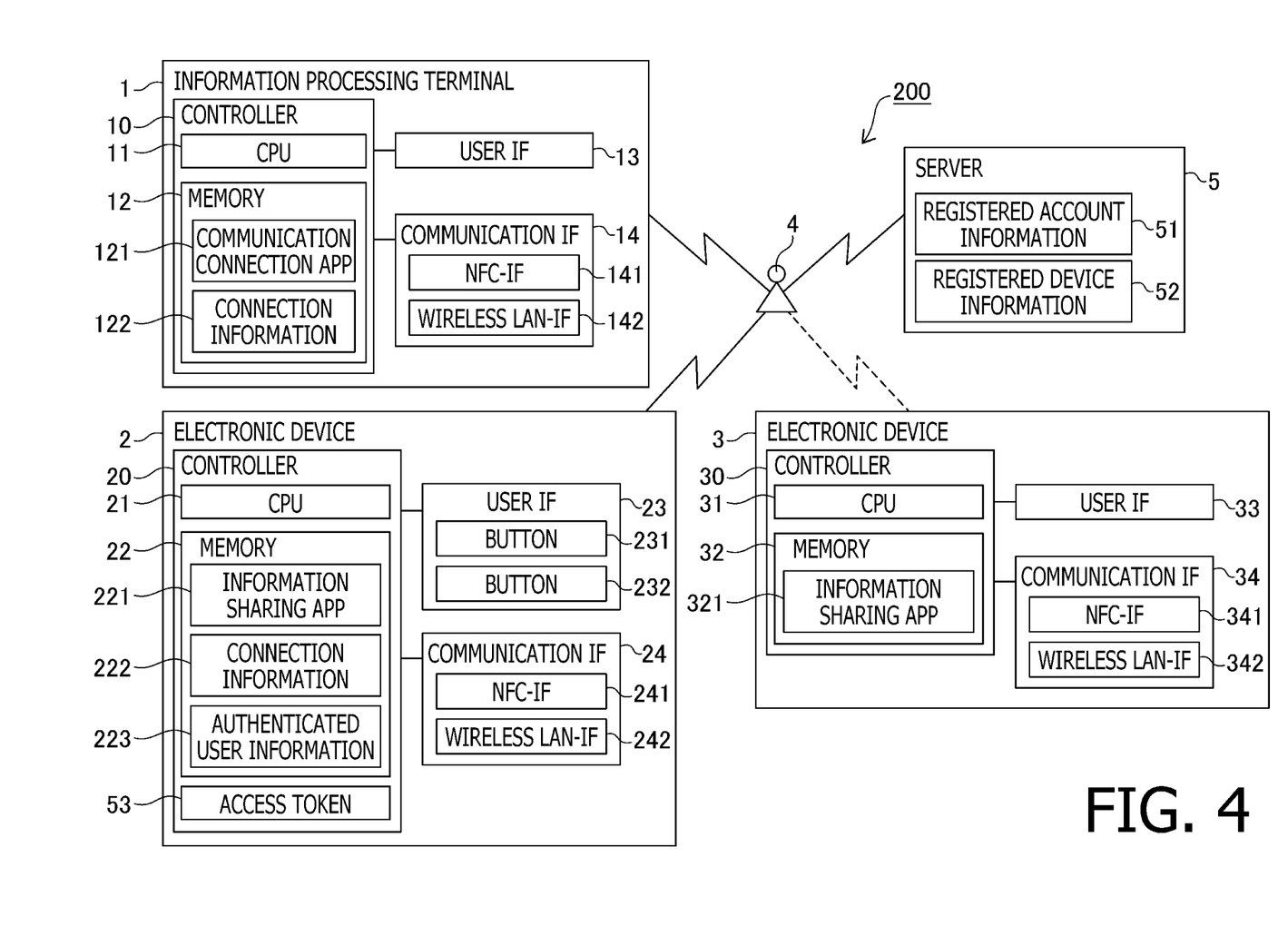
FIG. 4 is a schematic block diagram of a communication system according to a second embodiment.

The communication system 200 in this embodiment includes the information processing terminal 1, the electronic device 2, the electronic device 3, the access point 4, and a server 5, as shown in FIG. 4. Each configuration, except the server 5, is the same as each configuration of the communication system 100 in the first embodiment.

The server 5 is, for example, a device capable of communicating with the information processing terminal 1 and the like via the Internet, and is a cloud server managed by a vendor of the communication connection app 121 and the information sharing app 221. The server 5 in this embodiment completes registration of an account and registration of the electronic devices in advance. The registration of the account is a process in which the server 5 creates and stores account information based on a combination of the user information and apassword entered from the information processing terminal 1. This causes the server 5 to store the registered account information 51, which indicates the registered account information. When the server 5 receives the account information output from the information processing terminal 1 or the like requesting a login, the server 5 performs authentication, including determining whether the accepted account information is included in the registered account information 51 stored in the server 5 itself.

The server 5 according to this embodiment accepts registration of the electronic devices from the information processing terminal 1 that has logged in with the authenticated account information when the authentication of the received account information is successful. The registration of the electronic device is a process of storing information of the electronic device entered from the logged-in information processing terminal 1 in correspondence with the registration account information 51. This causes the server 5 to store the registered device information 52 indicating the information of the electronic device registered in correspondence with the registered account information 51. In this embodiment, it is assumed that the account information of a user using the communication connection app 121 at the information processing terminal 1 is registered in the registered account information 51, and the information of the electronic device 2 is registered in the registered device information 52 in correspondence with the account information.

Figure 5:
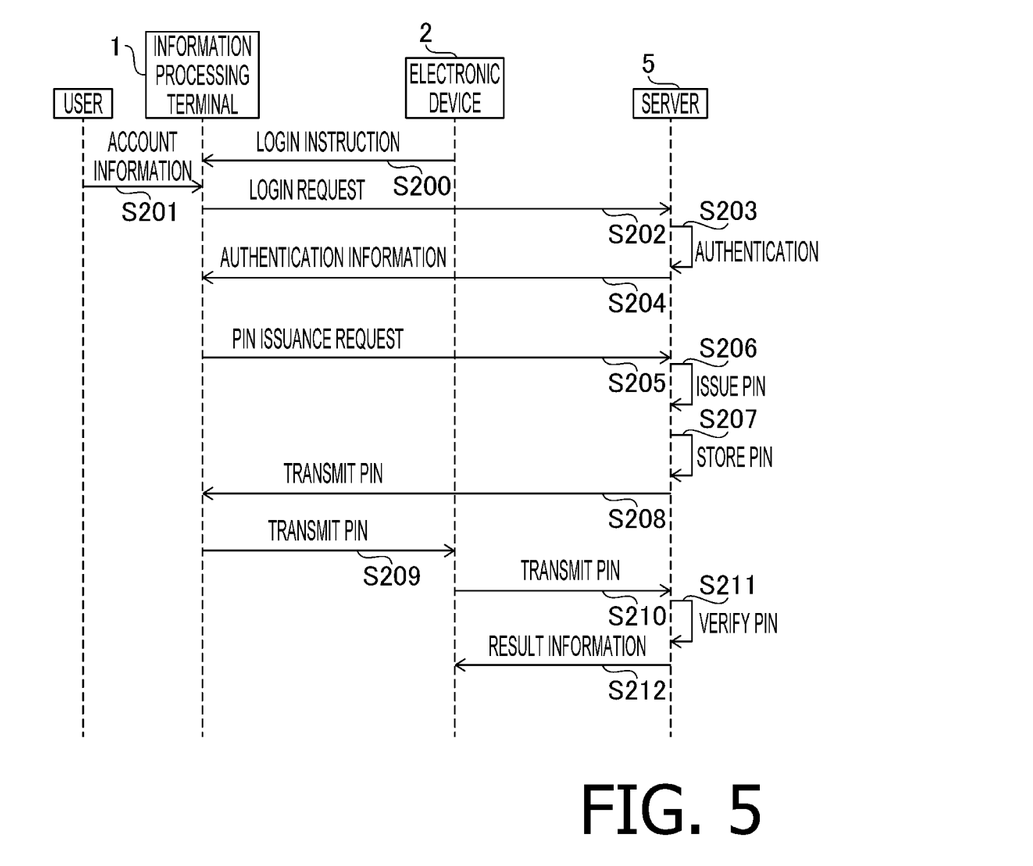
FIG. 5 is a sequence diagram showing a procedure for authentication using a server.

Next, the procedure of obtaining authentication information and determining the authentication using the server 5 will be described with reference to the sequence diagram shown in FIG. 5. The procedure shown in FIG. 5 is performed in place of S112 and S113 of the information sharing process shown in FIG. 2. In other words, the information sharing process of this embodiment is a process including S101 to S111 of FIG. 2, each procedure shown in FIG. 5, and S120 to S132 of FIG. 2.

Figure 2:
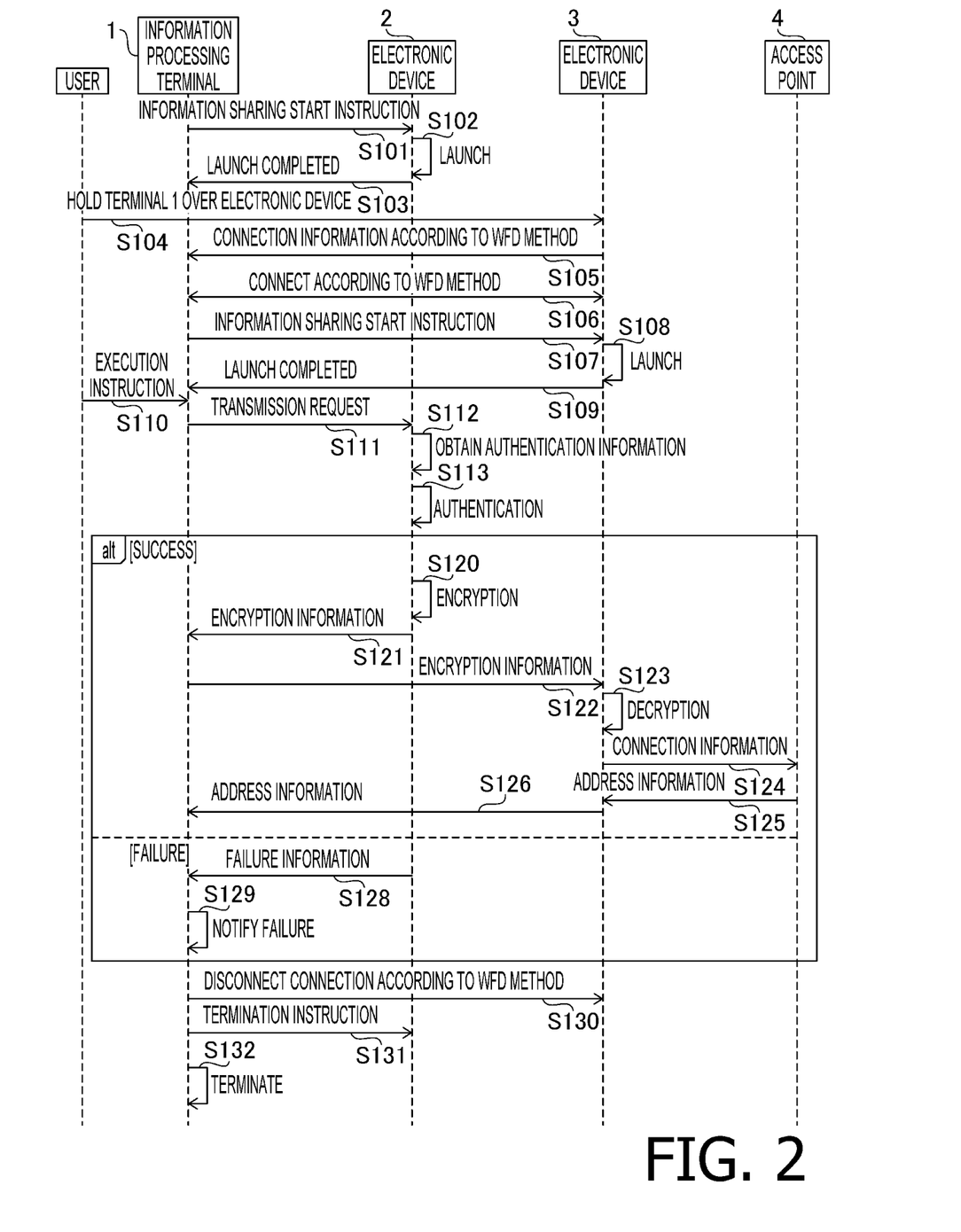
FIG. 2 is a sequence diagram showing a procedure of an information sharing process.

When the electronic device 2 receives a transmission request from the information processing terminal 1 in SIll of FIG. 2, the electronic device 2 proceeds to the sequence diagram in FIG. 5 and transmits a login instruction to the information processing terminal 1 to log in to the server 5 (S200). When receiving the login instruction from the electronic device 2, the information processing terminal 1 displays an account information entry screen and accepts the user's entry of the account information (S201). The information processing terminal 1 transmits user account information to the server 5 based on the entered account information and performs a login request (S202). The server 5 authenticates based on the received account information and the registered account information 51 stored in the server 5 (S203), and sends the authentication information indicating that the authentication is completed successfully to the information processing terminal 1 (S204). It is noted that processing S201 to S204 may be performed before this information sharing process is started.

When the authentication at the server 5 is successful, the information processing terminal 1 transmits an issuance request (S205), which is information requesting the issuance of a PIN to the server 5. When the information sharing process is started while the server 5 is already logged in, the information processing terminal 1 sends a transmission request (S111) to the electronic device 2, for example, and then sends the issuance request to the server 5.

The server 5 issues a PIN when receiving the issuance request of the PIN from the information processing terminal 1 in the logged-in state (S206). The PIN issued by the server 5 is an example of authentication information. The server 5 associates the issued PIN with information indicating the information processing terminal 1, which is the device that sent the issuance request, and stores the PIN in the server 5 itself (S207).

Further, the server 5 transmits the issued PIN to the information processing terminal 1, which is the device that sent the request to issue the PIN (S208). The information processing terminal 1 transmits the PIN received from the server 5 to the electronic device 2 (S209). The electronic device 2 uses the access token 53 to access the server 5 and sends the PIN received from the information processing terminal 1 to the server 5 (S210).

The server 5 performs an authentication procedure to verify the PIN based on whether a PIN that matches the PIN received from the electronic device 2 is stored in the server 5 itself (S211). When the server 5 stores a plurality of PINs, the server 5 compares the PINs stored in association with the information of the information processing terminal 1 with the received PIN based on the access token 53 used. The server 5 then transmits result information indicating the success or failure of the PIN authentication procedure to the electronic device 2, which is the device that sent the PIN (S212). Based on the result information received from the server 5, the electronic device 2 determines whether the authentication has been successful, and proceeds to [SUCCESS] or [FAILURE] in the sequence diagram of FIG. 2.

In this embodiment, the server 5 checks whether the user requesting the issuance of the PIN is the authorized user or not, as the PIN can be issued upon successful login to the server 5. The server performs the authentication procedure, which eliminates the need for the electronic device 2 to manage the authentication information, thereby security being enhanced and the load on the electronic device 2 being reduced.

The information processing terminal 1 may be configured to send the transmission request to the electronic device 2 after successfully logging in to the server 5 and receiving the PIN. In other words, the information processing terminal 1 may receive the execution instructions in S110 of FIG. 2, and then execute S201 to S208 of FIG. 5, i.e., receive the input of the account information and log in to the server 5, and receive the PIN issued at the server 5. In this case, the information processing terminal 1 sends the PIN together with the transmission request in S111 in FIG. 2. The electronic device 2 then executes S210 to S212 of FIG. 5 instead of S112 to S113 of FIG. 2.

Figure 6:
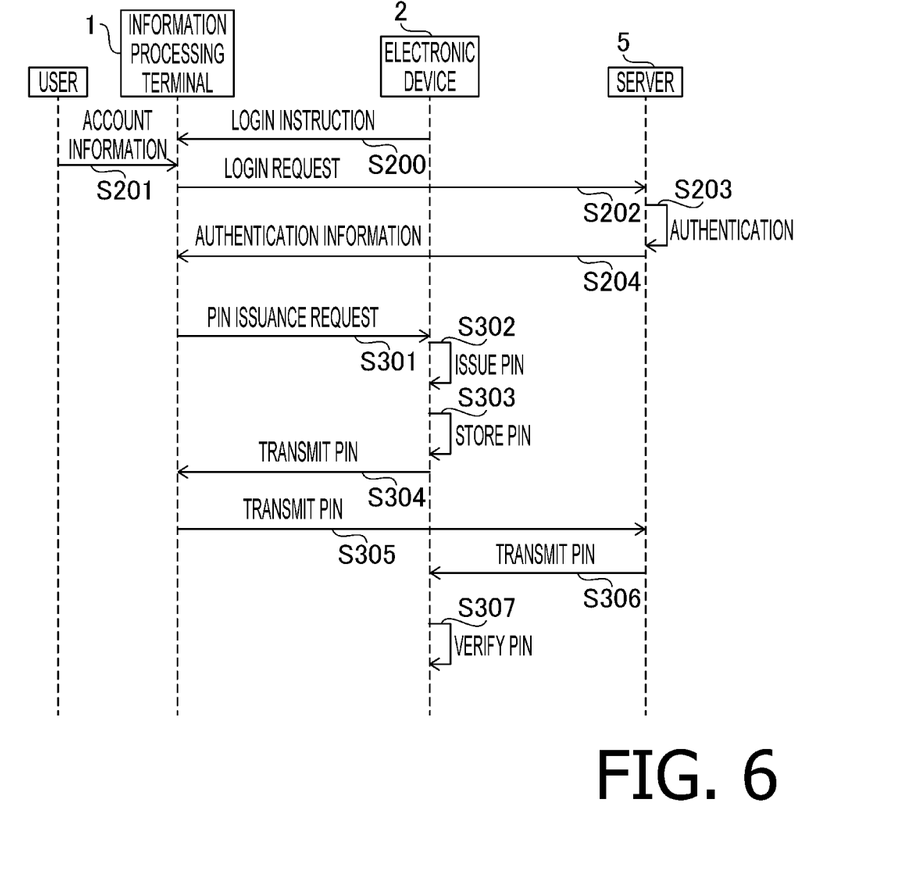
FIG. 6 is a sequence diagram showing a procedure for authentication using a server.

Next, a modification of the present (second) embodiment will be described with reference to a sequence diagram shown in FIG. 6. The sequence diagram of FIG. 6 shows another procedure for obtaining authentication information and determining authentication using the server 5, which is executed in place of the sequence diagram of FIG. 5. In this procedure, the user who uses the communication connection app 121 at the information processing terminal 1 should also register the account information and register the electronic device 2 as described above. As in the example in FIG. 5, the user logs in to the server 5 at the information processing terminal 1 (S200 to S204).

In the example shown in FIG. 6, the information processing terminal 1 sends a request to issue a PIN to the electronic device 2 (S301). When the electronic device 2 receives the PIN issuance request, the electronic device 2 issues a PIN (S302) and stores the issued PIN in the memory 22 of the electronic device 2 itself (S303). The PIN issued by the electronic device 2 is an example of PIN information. The electronic device 2 further sends the issued PIN to the information processing terminal 1 (S304).

The information processing terminal 1 adds information of the electronic device 2, which is the device that issued the PIN, to the received PIN and transmits the information to the server 5 (S305). In S305, the information processing terminal 1 also transmits information instructing the server 5 to send the PIN to the electronic device 2.

The server 5 transmits the received PIN to the electronic device 2 based on the instructions from the information processing terminal 1 (S306). It is noted that the server 5 transmits the PIN when the instruction is from the information processing terminal 1 in a logged-in state that has been successfully authenticated at the server 5, and does not transmit the PIN when the information process terminal 1 is not in a logged-in state.

When the electronic device 2 receives the PIN from the server 5, the electronic device 2 compares the PIN with the PIN stored in the memory 22 of the electronic device 2 itself and performs the authentication procedure to confirm the PIN is correct (S307). The electronic device 2 determines that the authentication is successful when it is determined that the PINs match, and proceeds to [SUCCESS] in the sequence diagram of FIG. 2. When the electronic device 2 determines that the PINs do not match, or when the electronic device 2 does not receive the PIN after a particular waiting period, the electronic device 2 proceeds to [FAILURE] in the sequence diagram of FIG. 2. By authenticating at the electronic device 2, the server 5 does not have to perform the authentication procedure and avoids concentration of processes at the server 5.

The information processing terminal 1 may receive the execution instruction in S110 of FIG. 2 and accept the user's operation to log in to the server 5. Concretely, the information processing terminal 1 performs processing S201 to S204 of FIG. 6 after executing S110 of FIG. 2, and then transmits the PIN issue request in S301 of FIG. 6 and the transmission request in S111 of FIG. 2. In this case, the electronic device 2 executes S302-S307 of FIG. 6 instead of S112-S113 of FIG. 2.

Alternatively, the information processing terminal 1 may accept the user's operation to login to the server 5 after the PIN is issued at the electronic device 2. Concretely, the information processing terminal 1 transmits the PIN issuance request in S301 of FIG. 6 along with the transmission request in S111 upon receiving the execution instruction in S110 of FIG. 2, and the electronic device 2 executes processing in S302 to S304 of FIG. 6 upon receiving the PIN issuance request. After receiving the PIN from the electronic device 2, the information processing terminal 1 executes processing in S201-S208 of FIG. 6, and after receiving the input of the account information and logging into the server 5, the information processing terminal 1 executes processing in S305 of FIG. 6. In this case, the electronic device 2 executes processing in S306 to S307 of FIG. 6 instead of S112 to S113 of FIG. 2.

As described in detail above, according to the communication system 200 of the present embodiment, the authentication procedure can be performed using the server 5. When the user is able to log in to the server 5, the electronic device 2 permits transmission of the connection information 222, as it is likely that such a user is requesting a connection to the appropriate wireless network. On the other hand, since the server 5 does not accept instructions from a user who is not logged in, the electronic device 3 can avoid being connected to the wireless network unnecessarily, thus increasing the security of the wireless network and the electronic device 3. In other words, in this embodiment, as in the first embodiment, the user's work can be reduced and lowering of the safety of the communication system 200 can be suppressed.

It is noted that each embodiment is merely an example and does not limit aspects of the present disclosures in any way. Therefore, the above-described embodiments and modifications can naturally be improved and modified in various ways within aspects of the present disclosures. For example, the number of devices constituting the communication system 100 or 200 should not be limited to the examples shown in the drawings, but may include one or more information processing terminals and two or more electronic devices.

Although multiple examples are described in each embodiment describes as a procedure to determine whether or not the connection information can be shared based on the authentication information, the communication system 100 may have at least one procedure. That is, at least one procedure may be performed by the communication connection app 121 of the information processing terminal 1 and the information sharing app 221 of the electronic device 2.

When the electronic device 3 receives the connection information 222 and completes the setup, the electronic device 3 may store the connection information 222 in the memory 32 of the electronic device 3 itself. When connecting other electronic devices to the communication network, the same process may be performed using the information sharing app 321 of the electronic device 3 instead of the information sharing app 221 of the electronic device 2.

In the information sharing process of FIG. 2, the procedures of S104 to S109, i.e., the procedures for establishing the WFD communication between the information processing terminal 1 and the electronic device 3, and starting the information sharing app 321 at the electronic device 3, may be performed only when the authentication is successful. For example, the communication connection app 121 may automatically send the transmission request in S111 once it receives information from the electronic device 2 about the completion of the startup. The electronic device 2 may then send information to instruct the electronic device 3 to start communication with the electronic device 3 to the information processing terminal 1 when the authentication of S113 is successful.

It is not necessary to encrypt the connection information. It is only necessary that the electronic device 3, which has received the connection information 222, can determine that the connection information 222 was information sent by the electronic device 2. That is, the connection information 222 with the identification information of the electronic device 2 may be sent. However, encryption increases the security of the wireless network.

In the above-described embodiments, the electronic device 2 transmits the failure information to the information processing terminal 1 when the authentication fails, but the electronic device 2 may not transmit the failure information. The information processing terminal 1 does not have to notify the failure. The electronic device 2 may also transmit information indicating that the authentication is successful to the information processing terminal 1 when the authentication is successful.

In the first embodiment, the information processing terminal 1 is only necessary to be capable of communicating with the electronic device 2, and may not have the connection information 122 of the access point 4. The connection information 122 of the information processing terminal 1 may be a different type of information from the connection information 222 the electronic device 2 possesses. The information processing terminal 1 may be set up in a wireless network, but may not have the connection information in a format that can be passed to other devices. In the second embodiment, the communication method between the server 5 and the information processing terminal 1 or the electronic device 2 may not be limited to the wireless communication via the access point 4, but may also be other communication methods.

In the above described embodiments, it is assumed that the electronic device 3 is a device that has not yet completed the setup to connect to the access point 4, but the electronic device 3 may be a device that has been completed the setup. In that case, the electronic device 3 may perform the setup again based on the connection information 222 received from the electronic device 2. For example, if the electronic device 3 has completed the setup to connect to an access point different from the access point 4, and the electronic device 3 receives the connection information 222 including the connection information 41 of the access point 4 from the electronic device 2, the electronic device 3 may complete the setup to connect to the access point 4. In this case, the electronic device 3 may delete the connection information of the other access points and store only the connection information 41 of the access point 4.

In the sequence diagram disclosed for each embodiment, multiple processes in arbitrary multiple steps can be arbitrarily changed in the order of execution or executed in parallel within the extent that there is no inconsistency in the processing content.

The processing disclosed in the embodiments and modifications may be executed on hardware such as a single CPU, multiple CPUs, an ASIC, or the like, or a combination thereof. The processing disclosed in the embodiments and modifications may be realized in various embodiments, such as a non-transitory recording medium recording instructions realizing a program for executing the processing, or a method.

What is claimed is:

1. A communication system including a first electronic device, a second electronic device and an information processing terminal, and is configured to perform wireless communication using a wireless network,
wherein the information processing terminal is configured to transmit a transmission request to the first electronic device, the transmission request requesting the first electronic device to transmit connection information of an access point of the wireless network, the connection information of the access point being possessed by the first electronic device based on a completion of a connection setup of the first electronic device to the access point of the wireless network using the connection information,
wherein the first electronic device is configured to perform:
obtaining authentication information in response to receipt of the transmission request;
determining whether to permit transmission of the connection information based on the authentication information as obtained; and
when it is determined, in the determining, to permit transmission of the connection information, transmitting the connection information the first electronic device possesses to the information processing terminal; and
when it is determined, in the determining, not to permit transmission of the connection information, not transmitting the connection information to the information processing terminal,
wherein, when receiving the connection information from the first electronic device in response to the transmission request, the information processing terminal transmits the received connection information to the second electronic device,
wherein, when receiving the connection information from the information processing terminal, the second electronic device completes the connection setup with the access point using the connection information received from the information processing terminal;
wherein the first electronic device comprises:
a first button corresponding to permission of transmission of the connection information; and
a second button corresponding to inhibition of transmission of the connection information, and
wherein the first electronic device is further configured to perform:
obtaining operation information indicating the first button or the second button is operated as the authentication information;
permitting transmission of the connection information when the operation information indicates that the first button is operated; and
not permitting transmission of the connection information when the operation information indicates that the second button is operated.

2. The communication system according to claim 1, wherein the first electronic device is configured to:
determine whether to permit transmission of the connection information based on the authentication information when the first electronic device obtains the authentication information from the information processing terminal in conjunction with receipt of the transmission request; and
receive the authentication information by receiving input of the authentication information through a user interface of the first electronic device and determine whether to permit the transmission of the connection information based on by obtaining the authentication information received through the user interface by receiving input of the authentication information through a user interface of the first electronic device when the first electronic device has not obtained the authentication information from the information processing terminal.

3. The communication system according to claim 1, wherein the information processing terminal is configured to transmit user information as the authentication information to the first electronic device in conjunction with transmission of the transmission request, and
wherein the first electronic device is configured such that when receiving the user information from the information processing terminal in response to receipt of the transmission request:
when a user identified by the received user information is a user having an administrative attribution, the first electronic device permits transmission of the connection information, and
when the user identified by the received user information is not a user having the administrative attribution, the first electronic device does not permit transmission of the connection information.

4. The communication system according to claim 1, wherein the information processing terminal is configured to transmit user information as the authentication information to the first electronic device in conjunction with transmission of the transmission request, and
wherein the first electronic device is configured to:
store the usage information indicating whether a transmission function of the connection information is usable in association with the user information; and
when receiving the user information from the information processing terminal in conjunction with receipt of the transmission request:
permit transmission of the connection information when the usage information associated with the received user information indicates that the transmission function is usable; and
not permit transmission of the connection information when the usage information associated with the received user information indicates that the transmission function is not usable.

5. The communication system according to claim 1, wherein the information processing terminal and the first electronic device are connected to a server,
wherein the authentication information is information used for an authentication procedure between the first electronic device and the server and information output from the server as authenticated by the server based on account information being outputted by the information processing terminal,
wherein, when receiving the transmission request, the first electronic device is configured to:
obtain the authentication information;
perform the authentication procedure between the first electronic device and the server based on the obtained authentication information;

permit transmission of the connection information when authentication is successful in the authentication procedure; and not permit transmission of the connection information when the authentication is failed in the authentication procedure.

6. The communication system according to claim 5, wherein the information processing terminal is configured to:

transmit the account information to the server;

transmit an issuance request requesting the authentication information to the server in a state where the account information is authenticated by the server;

receive the authentication information issued by the server in response to the issuance request; and transmit the received authentication information to the first electronic device, the server storing the authentication information as issued, and wherein the first electronic device is configured to:

transmit the authentication information received from the information processing terminal to the server;

receive result information indicating success or failure of the authentication procedure performed by the server; and permit transmission of the connection information when the received result information indicates success, while inhibiting transmission of the connection information when the received result information indicates failure, the server determining the authentication procedure is successful when the authentication information transmitted by the first electronic device matches the authentication information stored in the server, the server determining the authentication procedure is failure when the authentication information transmitted by the first electronic device does not match the authentication information stored in the server.

7. The communication system according to claim 5, wherein the information processing terminal is configured to:

transmit an issuance request to issue encrypted information to the first electronic device;

receive the encrypted information issued by the first electronic device in response to the issuance request;

transmit the account information to the server; and transmit the received encrypted information to the server in a state where the account information being authenticated by the server, the first electronic device storing the issued encrypted information, the server transmitting the received encrypted information to the first electronic device as the authentication information when receiving the encrypted information from the information processing terminal, wherein, when receiving the encrypted information from the server, the first electronic device is configured to perform the authentication procedure which is determined to be successful when the encrypted information received from the server matches the encrypted information stored in the first electronic device, the authentication procedure being determined to be failed when the encrypted information received from the server does not match the encrypted information stored in the first electronic device.

8. The communication system according to claim 1, wherein the first electronic device is configured to transmit the connection information encrypted in accordance with a particular method to the information processing terminal when determining that transmission of the connection information is permitted, and wherein, when the second electronic device receives the connection information encrypted by the first electronic device from the information processing terminal, the second electronic device is configured to decrypt the connection information and complete the setup to connect with the wireless network using the decrypted connection information.

9. An electronic device, comprising:

a communication interface; and a computer, wherein, when the computer is in a state where a setup to connect to an access point of a wireless network using connection information of the access point has been completed and receives, from an information processing terminal, a transmission request requesting to transmit the connection information of the access point via the communication interface, the computer is configured to perform:

an obtaining process of obtaining authentication information in response to receipt of the transmission request;

a transmission determining process of determining whether to permit transmission of the connection information based on the authentication information obtained in the obtaining process; and a transmission process of transmitting the connection information the electronic device possesses to the information processing terminal via the communication interface when it is determined in the transmission determining process to permit transmission of the connection information, the connection information being not transmitted to the information processing terminal when it is determined in the transmission determining process to not permit transmission of the connection information, wherein, when the information processing terminal receives the connection information from the electronic device based on the transmission request, the information processing terminal transmits the received connection information to an other electronic device, when receiving the connection information the other electronic device possesses from the information processing terminal via the communication interface, the computer is further configured to perform:

a setup process of completing the setup to connect to the access point using the connection information; and a setup result transmitting process of transmitting a result of the setup to connect to the access point in the setup process to the information processing terminal via the communication interface;

wherein the computer comprises:

a first button corresponding to permission of transmission of the connection information; and a second button corresponding to inhibition of transmission of the connection information, and wherein the computer is further configured to perform:

obtaining operation information indicating the first button or the second button is operated as the authentication information;

permitting transmission of the connection information when the operation information indicates that the first button is operated; and not permitting transmission of the connection information when the operation information indicates that the second button is operated.

10. A non-transitory computer-readable recording medium for an information processing terminal having a computer, the non-transitory recording medium containing computer-executable instructions realizing a program, the instructions cause, when executed by the computer, the computer to perform:

a first transmission process of transmitting a transmission request to a first electronic device, of which setup to connect to an access point of a wireless network using connection information of the access point has been completed, the transmitting request requesting transmission of the connection information of the access point the first electronic device possesses, the first electronic device receiving the transmission request:

obtaining authentication information in response to receipt of the transmission request;

determining whether to permit transmission of the connection information based on the obtained authentication information;

when determining to permit the transmission of the connection information, transmitting the connection information the first electronic device possesses to the information processing terminal;

when determining to inhibit the transmission of the connection information, not transmitting the connection information to the information processing terminal; and when receiving the connection information from the first electronic device based on the transmission request, a second transmission process of transmitting the received connection information to a second electronic device, the second electronic device received the connection information completing the setup with the access point using the received connection information;

wherein the first electronic device comprises:

a first button corresponding to permission of transmission of the connection information; and a second button corresponding to inhibition of transmission of the connection information, and wherein the first electronic device is further configured to perform:

obtaining operation information indicating the first button or the second button is operated as the authentication information;

permitting transmission of the connection information when the operation information indicates that the first button is operated; and not permitting transmission of the connection information when the operation information indicates that the second button is operated.

\* \* \* \* \*